(12) United States Patent
Batra

(10) Patent No.: US 8,288,028 B2
(45) Date of Patent: Oct. 16, 2012

(54) POWER STORAGE AND POWER TRANSFER METHOD AND APPARATUS

(76) Inventor: Jitendra Batra, San Jose, CA (US)

( * ) Notice: Subject to any disclaimer, the term of this patent is extended or adjusted under 35 U.S.C. 154(b) by 788 days.

(21) Appl. No.: 12/424,355

(22) Filed: Apr. 15, 2009

(65) Prior Publication Data

US 2009/0263704 A1 Oct. 22, 2009

Related U.S. Application Data

(60) Provisional application No. 61/046,426, filed on Apr. 19, 2008.

(51) Int. Cl.
*F03D 9/00* (2006.01)
*H02J 1/00* (2006.01)
*G06K 5/00* (2006.01)
*H01M 2/02* (2006.01)

(52) U.S. Cl. ............ 429/99; 307/66; 307/150; 320/115; 429/100; 429/159

(58) Field of Classification Search ............ 429/99, 429/100, 156, 157, 158, 159, 160; 307/66, 307/150; 320/115
See application file for complete search history.

(56) References Cited

U.S. PATENT DOCUMENTS

| | | | | |
|---|---|---|---|---|
| 3,838,745 A | * | 10/1974 | Kappei | 180/68.5 |
| 5,369,802 A | * | 11/1994 | Murray | 429/96 |
| 5,525,888 A | * | 6/1996 | Toya | 320/115 |
| 5,631,536 A | | 5/1997 | Tseng | |
| 5,640,078 A | | 6/1997 | Kou et al. | |
| 5,659,236 A | | 8/1997 | Hahn | |
| 5,686,811 A | | 11/1997 | Bushong et al. | |
| 5,780,993 A | | 7/1998 | Tsang | |
| 5,863,218 A | * | 1/1999 | Quat et al. | 429/96 |
| 5,900,715 A | * | 5/1999 | Roberts | 320/115 |
| 5,923,008 A | | 7/1999 | Williams, Jr. | |
| 5,951,229 A | * | 9/1999 | Hammerslag | 320/106 |
| 6,492,907 B1 | | 12/2002 | McCracken | |
| 6,897,575 B1 | | 5/2005 | Yu | |
| 6,936,376 B2 | * | 8/2005 | Plumadore | 429/99 |
| 7,339,349 B2 | * | 3/2008 | Kok | 320/110 |
| 2007/0152630 A1 | * | 7/2007 | Winkler et al. | 320/110 |
| 2007/0273325 A1 | | 11/2007 | Krieger et al. | |

* cited by examiner

*Primary Examiner* — Robert B Davis
(74) *Attorney, Agent, or Firm* — Haverstock & Owens LLP

(57) ABSTRACT

A power storing container replacement and charging method and system which allows continuous/uninterrupted power enables a user to continuously use a device without the device being relegated to a wired device for an extended period of time. The method and system includes an apparatus which is able to retain a power storing container for charging, and then receive a device with another power storing container which is replaced with the charged power storing container contained in the apparatus. The system reduces the wait time for a power storing container to charge and encourages use of the device without fear of the draining all the power from the device being unable to use the device for even a short period of time. The system also allows the power storing container in the device to be replaced without the device losing power and without involving any complicated steps from the user.

12 Claims, 11 Drawing Sheets

30 ⟶

| Standard Components | ⟵ 32 |
| Power Storing Container | ⟵ 34 |
| Locking Mechanism | ⟵ 36 |
| Lock Releasing Mechanism | ⟵ 38 |

| | |
|---|---|
| Slot 1 52 | Energy Saving Component 76 |
| Slot 2 54 | Locking Mechanism 78 |
| Body 56 | Lock Releasing Mechanism 80 |
| Charging Mechanism 58 | Unique Key 82 |
| Indicator 60 | Motorization 84 |
| Solar Panel 62 | Contacts 86 |
| Positioning Mechanism 64 | Connector 88 |
| Hinge 66 | Power Source Input 90 |
| Waterproofing 68 | Wind Power Mechanism 92 |
| Sized Backing Insert 70 | Display Insert 94 |
| Cover 72 | Computer System 96 |
| Type Auto Detection 74 | Identification System 98 |

Fig. 4

POWER STORAGE AND POWER TRANSFER METHOD AND APPARATUS

CROSS-REFERENCE TO RELATED APPLICATIONS

This application claims the benefit of U.S. Provisional Patent Application Ser. No. 61/046,426, filed Apr. 19, 2008, and entitled "HOT BATTERY SWAPPING AND CHARGING," which is hereby incorporated by reference in its entirety for all purposes.

FIELD OF THE INVENTION

The present invention relates to the field of electric power. More specifically, the present invention relates to advanced power storage, power transfer and modular power bank technology.

BACKGROUND OF THE INVENTION

As most of the devices in the world are becoming wireless, portable, solar/alternate energy powered, the demand for stored power is increasing. Rechargeable power storing containers are the most accepted method of storing power. Wireless and mobility devices use electric power stored within the device itself. When stored power in the device is used up, the user transfers power from the electric grid to the device by connecting wires. This transfer of power by connecting wires is an inconvenient and time consuming process and limits mobility and usage of the device.

Battery technology has failed to keep up with this rapidly increasing demand of battery power. For manufacturers of devices, rapidly discharging batteries have become a problem in meeting customers demand and a bottleneck in bringing innovative applications/devices/vehicles into the market.

For users, rapidly discharging battery and long duration of a device coupled to a wired charger for recharging a battery has become a source of major inconvenience, reducing overall dependency on battery-powered device and defying the very purpose (wireless, mobility, portability) of the device.

For battery manufacturers, the problem is to make batteries retain a larger amount of electric charge on a single charge. If manufacturers try to pack more cells or use different chemicals into the battery, then the battery is able to become unsafe, explosive and heavy.

For battery charger manufacturers, if they try to make fast chargers, then the chargers become bulky, generate a lot of heat and the batteries overheat and are able to explode.

Usually a manufacturer supplies a wired battery charger with a wireless device. While charging, the wireless device is temporarily converted into a wired device limiting the mobility of the device.

In a normal pattern, a manufacturer-supplied battery is charged in the device itself (with the manufacturer supplied charger) for a few hours usually at night or when the user is expecting to be stationed at one place for a period of time.

The usage of the battery-powered devices and power hungry applications is rapidly increasing. Only one charge during the night for a few hours is not enough for the whole day or trip anymore, so the user needs to charge the device multiple times which limits the use, portability and mobility of the device.

Possible solutions include:
1. Limiting the use of power hungry applications or limiting the use of the device.
2. Carrying a battery charger along with the device and charging the battery whenever the power runs low.
3. Buying multiple chargers and keeping them at multiple places.
4. Buying two batteries, planning ahead and charging them in turns within the device before stepping away from the charger or electric outlet. Then, carrying the spare battery along with the device and changing the batteries frequently.
5. Buying two batteries with one charger capable of charging the spare battery in the charger. Keeping the charger at multiple locations and changing the discharged battery with the charged battery when needed, allowing the spare battery to be charged while not limiting use and the mobility of the device.
6. Keeping the charger at multiple locations and changing the discharged battery with the charged battery.
7. Allowing the spare battery to be charged while not limiting use and the mobility of the device.

Each of the above solutions has its own flaws and limitations.

When electric power is transferred:
Normally, the charger and the device store power in different kind of batteries, and today wires are used to transfer the power or electric charge from the charger's battery to the device's battery, these wires are a slow option and usually take 2 to 8 hours to fully transfer the power.

If large amount of electric power is transferred through the wires then
1) The wires need to be bigger, thicker, heavier and costlier.
2) Users will not prefer using or carrying such wires.
3) These wires will not be commercially viable.
4) This super power transfer through thicker wires will make devices bigger, bulkier and all circuitry within the device will be changed to accommodate this power surge.

SUMMARY OF THE INVENTION

An advanced power storage, power transfer and charging method, device and system enables a user to continuously use a device such as a wireless device by providing instant power on demand without the device being relegated to a wired device for an extended period of time. The advanced power storage, power transfer and charging method includes a power storage device called power bank which can instantly transfer a charged power storing container into a device while releasing the power storing container for re-charging. The advanced power storage, power transfer and charging method also allows the power storing container in the device to be transferred without losing power or disconnecting the device from applications for even a fraction of a second.

In one aspect, an apparatus comprises a body, a first slot contained within the body, the first slot configured for receiving a first power storing container and a device and configured for charging the first power storing container and a second slot contained within the body, the second slot configured for receiving a second power storing container and the device and configured for charging the second power storing container. The first power storing container and the second power storing container are selected from the group consisting of a rechargeable battery, a lithium ion battery, a water power device, a methane power device, a fuel cell, a capacitor, a transistor, a charged metal, a hybrid power device and/or combinations thereof. The body, the first slot and the second slot are configured to permit the device sliding between the first slot and the second slot. The sliding occurs in less than 2 seconds. The first slot and the second slot each include a contact configured for coupling with one of the first power storing container and the second power storing container for supplying power to the one of the first power storing container and the second power storing container. The first slot and the second slot each include a fastening mechanism configured for securing one of the first power storing container and the second power storing container in place, and further wherein the first slot and the second slot each include a fastening releasing mechanism configured for releasing the power storing container. The apparatus further comprises a positioning mechanism configured for positioning the first power storing container and the second power storing container for alignment with the device and retaining the first power storing container and the second power storing container within the body, wherein the positioning mechanism is selected from the group consisting of a magnet, a guide and a clip. The first slot and the second slot are positioned within the body in proximity so that when the device is moved between the first power storing container and the second power storing container, the device does not lose power by remaining in contact with at least one of the power storing containers at the time of a power container transfer. The apparatus further comprises a cover configured for closing an opening of the body, wherein the cover is selected from the group consisting of a push-down lid, a roll-around device and a flap. The apparatus further comprises a solar panel slot and a removable solar panel configured to generate and provide power to charge the first power storing container and the second power storing container. The apparatus further comprises one or more modular slots configured for receiving an object to modify look and add functionality to the apparatus, wherein the one or more modular slots are configured for receiving a modular digital photo frame, a digital calendar, a digital camera, a digital clock, a display system, a digital weather station, and a radio waves connected news and information system. The apparatus further comprises a slot for attaching a wind-power generator. The apparatus further comprises a computing system including a screen and a speaker phone mechanism. The body is foldable. The body is configurable to receive different form-factors. The apparatus further comprises a power storing container detection mechanism configured to determine a power storing container type. The apparatus further comprises an electricity wastage avoidance mechanism configured to turn on and off power flow to the apparatus when the device is inserted into one of the first slot and the second slot. The apparatus further comprises a unique key mechanism configured to permit a designated device to couple to one of the first slot and the second slot. The apparatus further comprises a status indicator. The apparatus further comprises an input and output connector selected from the group consisting of proprietary designed, Universal Serial Bus, Firewire and Bluetooth. The apparatus further comprises a motorized mechanism for automatically moving the device to transfer between the first power storing container and the second power storing container. The apparatus further comprises an identification system to identify, store and transmit identification data of any module and power storing container coupled to the body. The identification system is selected from the group consisting of radio frequency identification and bar code identification. The identification data is stored on a storage device selected from the group consisting of flash memory, hard drives, silicon chips and capacitors. The identification data is transmitted using an implementation selected from the group consisting of radio frequency, wi-fi, global system for mobile communications, wi-max, Bluetooth, long term evolution and telephone wires. The apparatus acts as a power bank with facility to store power in modular power storage containers and a mechanism for power transferring wherein electrical charge is transferred with a power storing container itself, and in a single step, the mechanism with the apparatus allows the power storing container to replace itself with a fully powered or charged power storing container instantly and in a completely automated fashion without interruption of a host device's primary function and in a manner that is completely transparent to a user of the host device, in the same step, the power storing container also puts itself in a repowering position in a completely automated fashion, transparent to the user. Fully re-charging the device without connecting any wires occurs in less than 2 seconds.

In another aspect, a method of replacing a power storing container comprises positioning a device with a first power storing container into a power bank and moving the device away from the first power storing container and to a second power storing container that has been charged within the power bank. The method further comprises positioning the device with the second power storing container into the power bank and moving the device away from the second power storing container and to the first power storing container. One of the first power storing container and the second power storing container remains in the device and charges. The device does not lose power when moving between the first power storing container and the second power storing container. The first power storing container and the second power storing container are selected from the group consisting of a rechargeable battery, a lithium ion battery, a water power device, a methane power device, a fuel cell, a capacitor, a transistor, a charged metal, a hybrid power device and/or combinations thereof.

In another aspect, a method comprises inserting a device including a first power storing container into a power bank, decoupling the first power storing container from the device, coupling the device to a second power storing container positioned in the power bank and decoupling the second power storing container from the power bank. The method further comprises inserting the device including the second power storing container into the power bank, decoupling the second power storing container from the device, coupling the device to the first power storing container positioned in the power bank and decoupling the first power storing container from the power bank. The first power storing container and the second power storing container begin to charge upon insertion into the power bank. The first power storing container and the second power storing container are approximately fully charged when decoupling from the power bank. The device includes a backup power storing container for providing power to the device while the device is decoupled from the first power storing container and the second power storing container. The method further comprises moving the device between the first power storing container and the second power storing container. The first power storing container and the second power storing container are selected from the group consisting of a rechargeable battery, a lithium ion battery, a water power device, a methane power device, a fuel cell, a capacitor, a transistor, a charged metal, a hybrid power device and/or combinations thereof.

In another aspect, a system comprises a first power storing container, a second power storing container, a device configured for utilizing the first power storing container and the second power storing container and a power bank configured to receive the device and transfer the first power storing container and the second power storing container without the device losing power. The power bank is further configured to transfer the second power storing container into the device without disconnecting applications on the device, in a few seconds. The first power storing container and the second power storing container are transferred by moving the device within the power bank. The first power storing container and the second power storing container are selected from the group consisting of a rechargeable battery, a lithium ion battery, a water power device, a methane power device, a fuel cell, a capacitor, a transistor, a charged metal, a hybrid power device and/or combinations thereof.

In another aspect, a power storage and power transferring system wherein electrical charge is transferred with a power storing container itself, the power storing container replaces itself with a fully powered or charged power storing container in a completely automated fashion without interruption of a host device's primary function and in a manner that is completely transparent to a user of the host device, the power storing container also puts itself in a repowering position in a completely automated fashion, transparent to the user, in a few seconds.

In another aspect, a multi-user apparatus comprises a body, with an array of more than two power storage containers mounted on a moving charging conveyor belt mechanism, wherein the conveyor belt mechanism carries multiple power storage containers from one slot to another; and a plurality of power banks each configured for transferring and charging a power storing container, wherein the plurality power banks each include a mechanism to store, charge and position the plurality of power storing containers.

In another aspect, a vending device comprises a body and a plurality of power banks each configured for transferring and charging a power storing container. The plurality of power banks each include a mechanism to store, charge and position a plurality of power storing containers.

In yet another aspect, a power storing container comprises a power storing component and an identification mechanism identifying the power storing container. The identification mechanism is standard and unique. The identification mechanism is readable by an identification system. The identification system is selected from the group consisting of radio frequency identification and bar code identification.

BRIEF DESCRIPTION OF THE DRAWINGS

FIG. 3 illustrates a block diagram of a device according to some embodiments.

FIG. 4 illustrates a block diagram of a power bank according to some embodiments.

DETAILED DESCRIPTION OF THE PREFERRED EMBODIMENT

In the instant power storage and power transfer method and apparatus, the power-bank and the device store power in power storing containers. The power storing containers are able to be interchangeable and modular. The power is transferred with the power storing container. When the user wants to power his device, by using the power bank, the user can do so:

1) easily, effortlessly and instantly;
2) without connecting any wires;
3) transfer the stored power and the power storing container from the power bank to the device;
4) transfer the power storing container from the device to the power bank;
5) start re-charging the power storing container;
6) all activity is completely transparent to the user; and
7) it is all completed in a matter of seconds, almost instantly.

The instant power storage and power transfer method and apparatus described herein overcomes the drawbacks of the issues described above. In addition, the instant power storage and power transfer method and apparatus avoids a series of time consuming and inconvenient steps. Some of the steps avoided by the instant power storage and power transfer method and apparatus include switching off all of the powered applications, powering down the device, opening a battery cover, touching a potentially hot, toxic or electric current-leaking battery, removing a discharged battery from the device, unplugging the charger from the electric socket, removing the charged battery from the charger, inserting the discharged battery into the charger, inserting the charged battery into the device, closing the battery cover on the device, powering on the device and restarting all of the powered applications. The power bank is able to be viewed as an advanced battery charging system since the charging occurs while a user does not need the battery, and then when the battery is needed, it is, in a way, immediately charged. Furthermore, the power bank permits a device to be used and the power storing container transferred, without the device shutting down.

The term "power storing container" used herein includes any power storing device or power container including but not limited to any rechargeable battery, a lithium ion battery, a water power device, a methane power device, a fuel cell, a capacitor, a transistor, a charged metal, a hybrid power device and/or combinations thereof.

Figure 1:
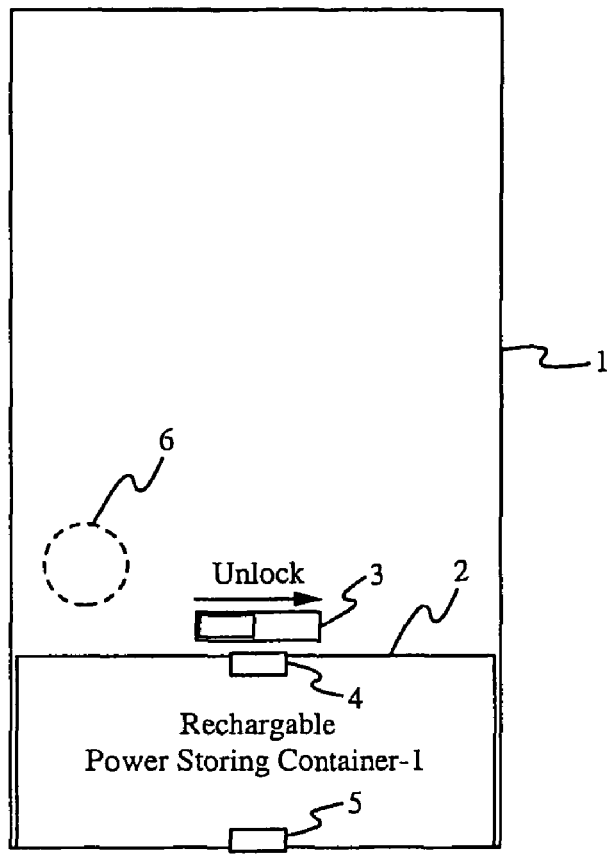
FIG. 1 illustrates a block diagram of a device according to some embodiments.
Figure 2:
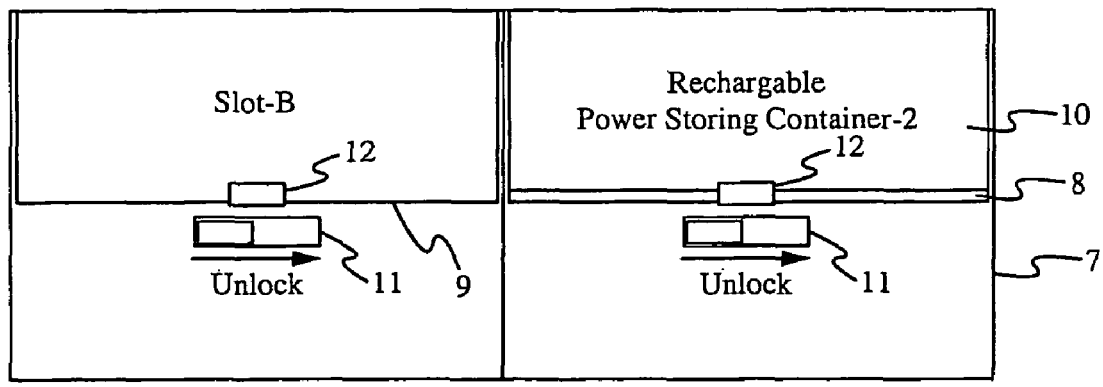
FIG. 2 illustrates a block diagram of a power bank according to some embodiments.

FIG. 1 illustrates a block diagram of a device 1. FIG. 2 illustrates a block diagram of a power bank 7. The following description references FIGS. 1 and 2. The device 1 includes a detachable first power storing container 2 with a locking mechanism 4 and a lock releasing mechanism 3. In some embodiments, the device 1 includes a second locking mechanism 5. The locking mechanism 4 and the second locking mechanism 5 are able to be any type of locking mechanism or fastening such as a switch, a button, a slidable switch or any other locking mechanism. The lock releasing mechanism 3 is able to be any type of lock releasing mechanism such as a lever, a button or any other lock releasing mechanism. In some embodiments, the lock releasing mechanism 3 operates to unlock the locking mechanism 4 and/or the second locking mechanism 5. A rechargeable backup power storing container 6 is able to be included in the device 1.

The backup power storing container 6 is able to power the device 1 momentarily while the first power storing container 2 is being transferred, preventing the device 1 from turning off, thus making the device 1 hot transferrable. In some embodiments, instead of a backup power storing container 6, the device 1 is coupled to an outlet to temporarily provide power.

In some embodiments, the first power storing container 2 and/or a second power storing container 10 include a power storing container cover built embedded/integrated/attached with the power storing container (e.g. power storing container covers used in the laptop industry). A power storing container, for example the first power storing container 2, is able to be simultaneously locked and docked in the device 1 and the power bank 7. In some embodiments, the first power storing container 2 has the same locking mechanism 4 and charging contacts (commonly built on one side of the power storing container) built on two sides of the power storing container.

The power bank 7 includes two independent power storing container slots, a first slot 8 and a second slot 9 (also referred to as power storing container slot-A and power storing container slot-B). In some embodiments, there are more or less power storing container slots. In some embodiments, the first slot 8 and the second slot 9 have the same specifications. In some embodiments, the first slot 8 and the second slot 9 have different specifications. In some embodiments, the power storing containers have the same specification. In some embodiments, the power storing containers have different specifications.

In some embodiments, the power bank 7 includes locking mechanism(s) 12 and lock releasing mechanism(s) 11. In some embodiments, the device 1 and the power bank 7 have similar or the same locking mechanism, second locking mechanism and/or lock releasing mechanism. In some embodiments, the locking mechanism, the second locking mechanism and/or the lock releasing mechanism are different. In some embodiments, the power storing containers are able to be used by the device 1 while coupled to the power bank 7.

In use, initially, the first power storing container 2 is used in the device, and the second power storing container 10 is charging or already is charged in the first slot 8 of the power bank. Then, when the user wants to charge or replace the first power storing container 2, he is able to place the device 1 in the empty second slot 9 of the power bank 7 in such a manner that the power storing container is docked and locked in the power bank 7. With the first power storing container 2 locked in the device 1 and in the power bank 7, the user is able to toggle the lock releasing mechanism 3 to unlock the power storing container 2 from the device 1. The user is then able to remove the device 1 which is detached from the first power storing container 2. The device 1 does not have the first power storing container 2 in it at this point. The device 1 is powered by the backup power storing container 6 temporarily. The user then places the device 1 on the second power storing container 10 which docks and locks the second power storing container 10 in the device 1 at the same time being locked in the power bank 7 in the first slot 8. The device 1 has the second power storing container 10 coupled within which is a full-powered power storing container. The user is then able to press the lock releasing mechanism 11 of the first slot 8 on the power bank to unlock and release the second power storing container 10 from the first slot 8. The first power storing container 2 charges in the second slot 9 awaiting the next transfer. The user is able to repeat these steps, transfer the first power storing container 2 and the second power storing container 10, so that the device 1 is only very briefly coupled to a wired device.

FIG. 3 illustrates a block diagram of a device 30 according to some embodiments. FIG. 4 illustrates a power bank 50 according to some embodiments. The following description references FIGS. 3 and 4.

The device 30 includes standard components 32 and a removable, rechargeable power storing container 34. In some embodiments, the device 30 also includes one or more additional power storing containers, a locking mechanism 36 and a lock releasing mechanism 38.

Depending on the device 30, the standard components 32 are able to vary. For example, the standard components 30 for a mobile phone include a body/frame, an input device such as a keypad or touchscreen, circuitry for coupling to a cellular network, a display and input components for coupling the device 30 to other devices such as a personal computer. Contrastingly, standard components 30 for a vehicle would include components such as an engine, wheels, and other components.

The power storing container 34 is configured to decouple from the device 30. In some embodiments, the power storing container 34 is configured to move easily from the device 30. In some embodiments, the power storing container 34 and the device 30 each include cooperating grooves and/or rails and/or another implementation to permit easy and secure sliding with each other. Moving is able to include sliding, rolling such as using grooves and ball bearings or another implementation. In some embodiments, the moving is able to occur almost instantaneously. In some embodiments, the moving is able to occur in less than 1 or 2 seconds. In some embodiments, the power storing container 34 is configured to decouple from the device while the backing of the device 30 remains. An embodiment of the power storing container 34 is further described in FIG. 8.

The locking mechanism 36 is able to be used to secure the power storing container 34 within the device 30. The lock releasing mechanism 38 is able to be used to release the locking mechanism 36 to allow the power storing container 34 to be removed. In some embodiments, the locking mechanism 36 and the lock releasing mechanism 38 are the same mechanism. The locking mechanism 36 and the lock releasing mechanism 38 are able to be located anywhere on the device 30 and/or power storing container 34. In some embodiments, the locking mechanism 36 and the lock releasing mechanism 38 are configured to cooperate with a mechanism of a power bank 50 to automatically unlock the power storing container 34 when placed within the power bank 50. This is also able to prevent the power storing container 34 from being removed without the power bank 50. As described above, the additional power storing containers, locking mechanism 36 and lock releasing mechanism 38 are optionally included. Additional components are able to be included with the device 30 as well.

The power bank 50 is able to include a first power storing container slot 52, a second power storing container slot 54, a body 56, a charging mechanism 58, an indicator 60, a solar panel 62, positioning mechanism(s) 64, a hinge 66, waterproofing 68, a sized backing insert 70, a cover 72, a power storing container detection component 74, an energy saving component 76, a locking mechanism 78, a lock releasing mechanism 80, a unique key component 82, a motorized component 84, contact(s) 86, a connector 88, power source input(s) 90, a wind power mechanism 92, a display insert 94, a computer system 96 and an identification system 98.

In some embodiments, the body 56 includes an area to receive a device 30 and/or two or more power storing containers. In some embodiments, the area includes the first slot 52 and the second slot 54. In some embodiments, distinct slots are not designated. The first slot 52 and the second slot 54 are each configured to receive a power storing container and/or a device 30. In some embodiments, the first slot 52 and the second slot 54 are each configured to charge the power storing container. The charging mechanism 58 is able to provide power to charge the power storing containers received. In some embodiments, the first slot 52 and the second slot 54 each include a contact 86 to couple the power storing container to the charging mechanism 58. In some embodiments, the contact 86 is a spring-loaded contact. In some embodiments, the first slot 52, the second slot 54 and the body 56 are configured to allow two separate power storing containers to be retained and charged as well as to allow a device 30 to move between the first slot 52 and the second slot 54. The first slot 52 and the second slot 54 are configured to securely hold the device 30 and a power storing container. The first slot 52 and the second slot 54 are configured so that the device 30 is able to move between a first power storing container and a second power storing container while maintaining contact with at least one of the power storing containers so that the device 30 does not lose power when transferring power storing containers. In some embodiments, the body 56 does not include side walls so that the device 30 is able to be moved from one side to the other, similar to a credit card swiping device.

In some embodiments, implementations of reducing friction are utilized in the device 30, power storing container 34 and/or power bank 50. As described above, in some embodiments, grooves and ball bearings are able to be used. In some embodiments, the body 56 comprises a nonstick material to permit smooth moving of the device 30 between the first slot 52 and the second slot 54. In some embodiments, a material reducing friction is able to be used. In some embodiments, a velvet material or another smooth material is able to be used to also prevent scratching of the device. In some embodiments, a grease or grease-type material is used.

The body 56 includes positioning mechanism(s) 64 which are configured to position and secure the power storing containers in position. The positioning mechanism(s) 64 are also able to assist in aligning the power storing containers and the device 30. In some embodiments, the positioning mechanism(s) 64 are magnets, guides, clips and/or other mechanisms. In some embodiments, the positioning mechanism(s) 64 are movable to accommodate different sizes of devices and/or power storing containers. The positioning mechanism(s) 64 are able to be moved using any implementation such as buttons to move the positioning mechanism(s) 64 in place. In some embodiments, the positioning mechanism(s) 64 are located near the divider 100 (FIG. 5) and are able to move away from the divider 100 (FIG. 5) to decrease the size of the slots to accommodate different sizes of devices and/or power storing containers.

The power bank 50 is able to receive power from any of several different power sources. In some embodiments, the power source input 90 provides power to the power bank 50. For example, the power source input 90 couples to a power outlet. The power source input 90 is able to couple to any appropriate power source.

In some embodiments, the solar panel 62 is able to convert solar energy into usable power for the power bank 50 to charge a power storing container. In some embodiments, the solar panel 62 is removable and modular. In some embodiments, the solar panel 62 is able to be tilted to angle towards the sun. In some embodiments, when the power storing container is fully charged, the solar panel 62 is able to transfer power to an energy grid.

In some embodiments, the wind power mechanism 92 is configured to generate power from wind. The wind power mechanism 92 is able to be coupled to the power bank 50 to provide power to the power bank 50. The power bank 50 is able to include a slot for receiving the wind power mechanism 92.

In some embodiments, the connector 88 enables the power bank 50 to couple to another device such as a computer. The connector 88 enables the power bank 50 to receive power from the computer, receive and send data/information or other items from/to the coupled computer. The connector 88 is able to be a proprietary-designed, Universal Serial Bus (USB) connector, a Firewire connector, a wireless connector such as Bluetooth, or any other connector.

In some embodiments, the locking mechanism 78 is configured to lock the device 30 and/or a power storing container in place. As described above, the locking mechanism 78 is able to be any type of locking or fastening mechanism. In some embodiments, the lock releasing mechanism 80 is configured to unlock the device 30 and/or a power storing container. The lock releasing mechanism 80 is able to work in conjunction with the locking mechanism 78 to release the device 30 and/or power storing container when the device 30 and/or power storing container is ready to be released. As described above, the lock releasing mechanism 80 is able to be any type of lock releasing mechanism. Additional possible locking mechanisms and lock releasing mechanisms include motor operated locks/releases, stepper motor locks/releases, magnet locks/releases, electromagnet locks/releases and/or any combination thereof. In some embodiments, multiple locking mechanisms 78 and lock releasing mechanisms 80 are included to accommodate different sizes of devices and/or power storing containers.

In some embodiments, the indicator 60 is able to be any indicator such as light(s), a sound indicator, a video indicator and/or any other indicator. The indicator 60 is able to indicate the status of the power storing container or provide other status information. For example, a Light Emitting Diode (LED) is able to indicate that a power storing container is charging (red) and charged (green). The indicator 60 is able to be located anywhere on the power bank 50, such as on the outside of the body 56.

In some embodiments, the cover 72 covers the opening of the body 56 which is able to enclose and protect the inside of the power bank 50. The cover 72 is able to be any type of cover such as a spring-loaded push-down lid, a roll-around device, a fabric with slit(s) over the openings of the body 56, brushes, a wrinkle/folding cover, a flap or any other cover. In some embodiments, a side of the body 56 is able to be taller or shorter than the other to allow the cover 72 to utilize gravity to close. In some embodiments, the cover 72 and body 56 enclose the internal components such that a user is not able to see the internal components of the power bank.

In some embodiments, the sized back insert 70 enables the size of the first slot 52 and the second slot 54 to be modified. For example, a thicker insert 70 is able to form a smaller first slot 52 and a smaller second slot 54 to permit insertion of a smaller power storing container. Other shapes of inserts 70 are able to be used for other shapes/sizes/form factors of power storing containers.

In some embodiments, the power storing container detection component 74 is configured to detect the power storing container type when inserted into the power bank 50. For example, the power storing container detection component 74 is able to automatically detect the power storing container voltage of the inserted power storing container. The power bank 50 is then able to properly charge the power storing container. This allows a variety of power storing container types to be charged by the power bank 50.

In some embodiments, the energy saving component 76 is able to be used as an electricity wastage avoidance mechanism configured to turn on and off power flow to the power bank 50 when a device 30 is inserted into the power bank 50. When a device 30 is inserted into the power bank 50, the energy saving component 76 is triggered which turns on the power bank 50. The energy saving component 76 is able to minimize wasted power. The energy saving component is able to be a switch which is able to be timer-based, spring-based or another implementation. In some embodiments, multiple energy saving components 76 are included to accommodate different sizes of devices.

In some embodiments, the unique key component 82 is configured to permit a designated device to couple to the power bank 50. The unique key component 82 is able to be hardware, software or a combination thereof. For example, a hardware structure on the power bank 50 is configured to only receive a device 30 that is configured to fit with the unique key component 82. In a software implementation, the software is able to verify that the device 30 is permitted to utilize the power bank 50. A password or other security mechanism is able to be used.

In some embodiments, the motorized component 84 is able to automatically move the device 30 from one power storing container to the other and replace the power storing container in the device 30. The motorized component is able to include an arm, a guide system and/or another motorized component or robotic component to move the device 30.

In some embodiments, the display insert 94 enables displays to be presented on the power bank 50. For example, a company logo is able to be displayed on the text insert 94. The display insert 94 is able to be modular so that it is removable. The display insert 94 is able to be tilted or angled.

In some embodiments, the body 56 is configured to fold to have a smaller form factor. In some embodiments, the body 56 folds using the hinge 66 and a separated body that is able to fold. The body 56 is able to fold in any manner that is reasonable. A folded body allows the power bank 50 to have a smaller form factor when not in use, and then fold out to the standard body to transfer power storing containers.

In some embodiments, the power bank 50 includes waterproofing 68. Any waterproofing 68 is able to be implemented to protect the power bank 50.

In some embodiments, the computer system 96 enables the power bank 50 to act as a docking station. The computer system 96 includes any of a screen, a speaker phone, network capabilities, input capabilities such as a touchscreen, keyboard and/or mouse, and/or other computing components. In some embodiments, a user is able to couple to the Internet and receive weather, news, traffic and other information. In some embodiments, the screen is able to be tilted for viewing convenience.

Figure 8:
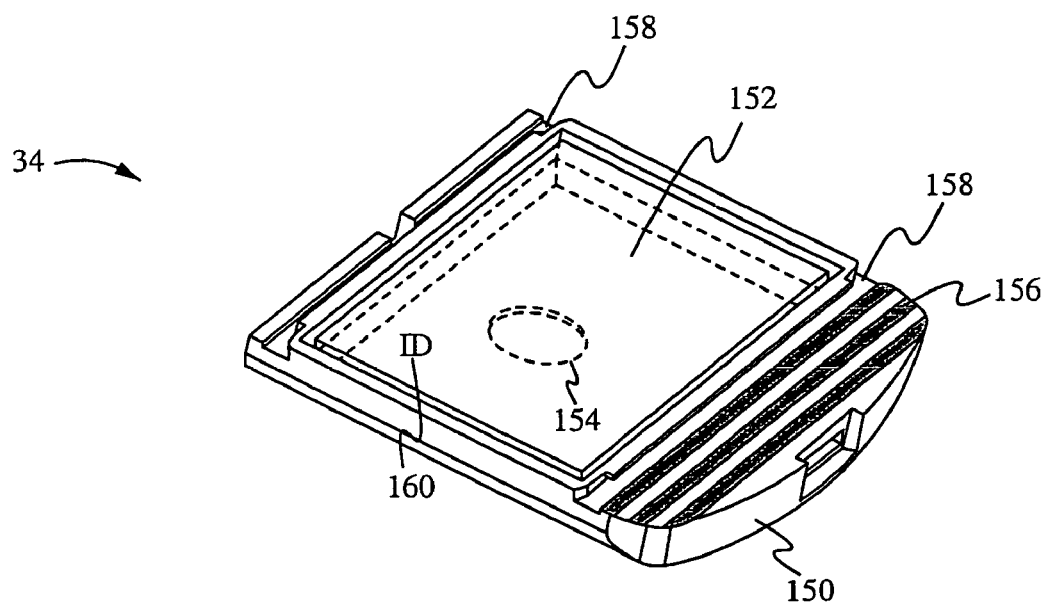
FIG. 8 illustrates a perspective view of a power storing container according to some embodiments.

In some embodiments, an identification system 98 is configured to identify, store and transmit identification data of each device, power storing container and/or other devices or modules coupled to the power bank 50. The identification system 98 includes but is not limited to radio frequency identification/reader and bar code identification/reader. The identification system 98 records the data on a device including but not limited to flash memory, hard drives, silicon chips and capacitors. The identification system 98 receives and transmits information using an implementation including but not limited to radio frequency, wi-fi, gsm, wi-max, Bluetooth and long term evolution (lte) and telephone wires. The identification system 98 is able to function in conjunction with an identification mechanism 160 (FIG. 8).

The power bank 50 is able to store any number of power storing containers. In some embodiments, extra power storing containers are stored in an array for use with the power bank 50.

Any of the components are able to be included or excluded depending on the embodiment. Additional components are able to be included as well.

Figure 5:
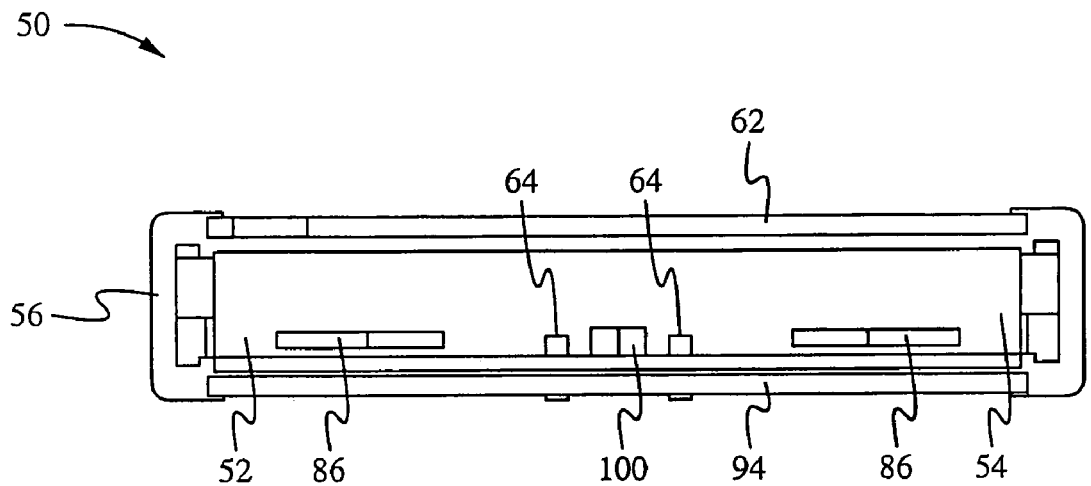
FIG. 5 illustrates a top view of a power bank according to some embodiments.

FIG. 5 illustrates a top view of a power bank 50 according to some embodiments. As described above, the power bank 50 includes a body 56 with a first slot 52 and a second slot 54. In some embodiments, the power bank 50, and more specifically, the first slot 52 and the second slot 54 are sized to provide a very tight fit for a received device 30 so that aligning the device and a power storing container is smooth and appropriate contact is maintained between the device 30 and the power storing container. In some embodiments, the first slot 52 and the second slot 54 are separated by a divider 100. In some embodiments, the divider 100 is configured to help guide a power storing container within the respective slot. At the bottom of the inside of the body 56 is a contact 86 within each of the first slot 52 and the second slot 54. In some embodiments, the contacts 86 are located in a different location. The body 56 is also configured to allow modular inserts such as a solar panel 62 and a display insert 94. In some embodiments, other modular inserts are able to be inserted in the front and/or rear insert location. FIG. 5 also shows an embodiment of movable positioning mechanisms 64 with buttons configured to move the positioning mechanisms 64 to an appropriate size based on the size of the power storing container and/or the device.

Figure 6:
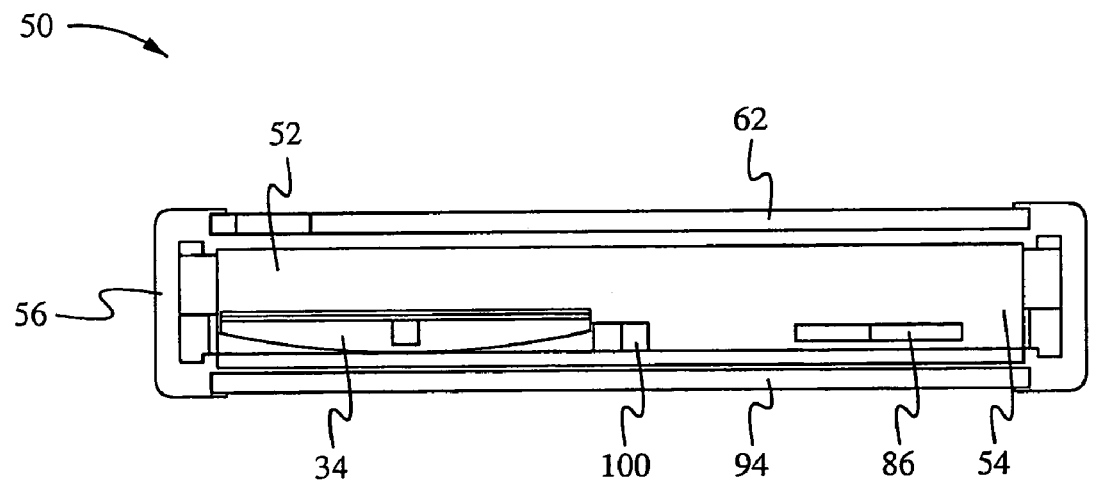
FIG. 6 illustrates a top view of a power bank with a power storing container according to some embodiments.

FIG. 6 illustrates a top view of a power bank 50 with a power storing container 34 according to some embodiments. As described above, the power bank 50 includes a body 56 with a first slot 52 and a second slot 54. In some embodiments, the first slot 52 and the second slot 54 are separated by a divider 100. At the bottom of the inside of the body 56 is a contact 86 within each of the first slot 52 and the second slot 54. A power storing container 34 is shown in the first slot 52 in contact with the contact 86 within the first slot 52. The power storing container 34 is able to be charged when in contact with the contact 86. The body 56 is also configured to allow modular inserts such as a solar panel 62 and a display insert 94.

Figure 7:
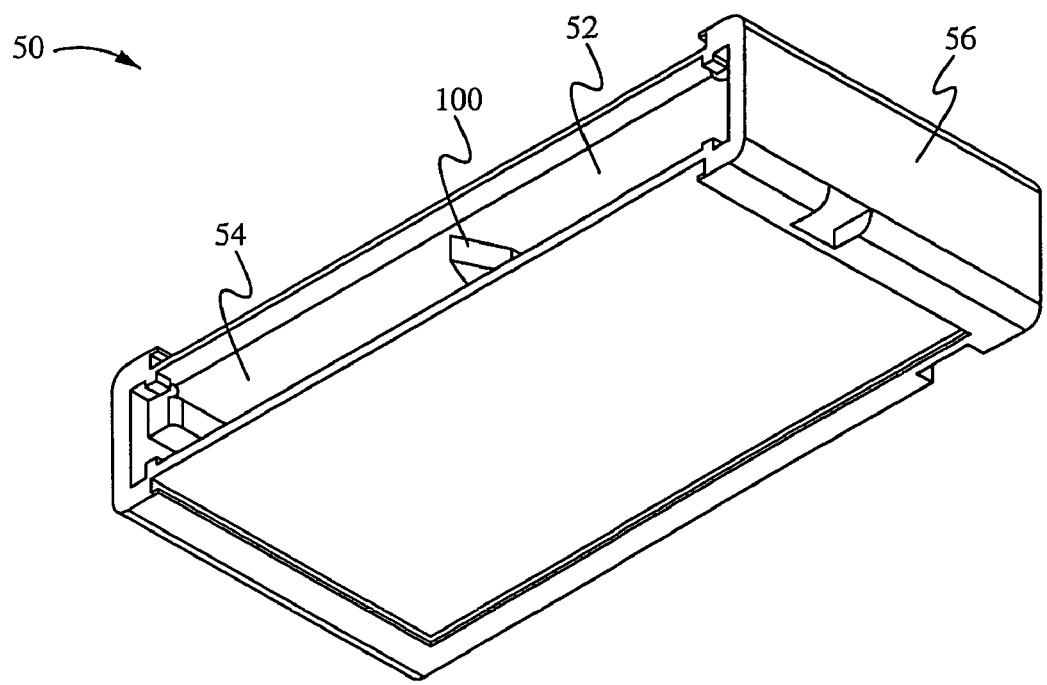
FIG. 7 illustrates a perspective view of a power bank according to some embodiments.

FIG. 7 illustrates a perspective view of a power bank 50 according to some embodiments. The view shows the power bank 50 and the body 56 with the first slot 52 and the second slot 54 separated by a divider 100. The body 56 includes front and back insert slots which are able to receive modular inserts such as a solar panel 62, a display insert 94 and other inserts.

FIG. 8 illustrates a perspective view of a power storing container 34 according to some embodiments. The rechargeable power storing container 34 includes a power storing container body 150, a power storing component 152, a power storing container positioning mechanism 154, contacts 156 and a coupling mechanism 158. The power storing component 152 is able to be any implementation to store power. The power storing container positioning mechanism 154 such as a magnet is able to position, align and/or secure the power storing container 34 in place in the power bank 50. In some embodiments, the power storing container positioning mechanism 154 works with the positioning mechanism 64 of the power bank 50. The power storing container positioning mechanism 154 is included in some embodiments. The contacts 156 provide the power interface between the power storing container 34 and the device 30. The contacts 156 are able to be located elsewhere and/or in a different configuration. The coupling mechanism 158 is able to be any implementation to enable the power storing container 34 to couple to the device 30. In some embodiments, the coupling mechanism 158 includes one or more rails and/or grooves which are designed to correspond with one or more rails and/or grooves of the device 30. In some embodiments, the coupling mechanism 158 enables the device 30 and the power storing container 34 to move into each other to couple together. In some embodiments, the power storing container 34 includes an identification mechanism 160 such as a Radio Frequency Identification (RFID), a bar code or another identifier. The identification mechanism 160 is able to be used to track the power storing container 34. The identification mechanism 160 is able to be standard, unique and possibly regulated so that each power storing container 34 has a distinct identifier.

Figure 9A:
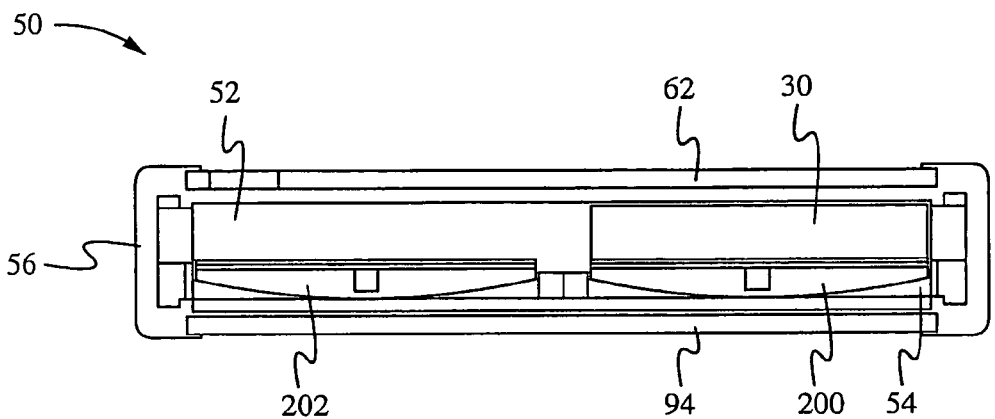
FIGS. 9A-C illustrate a top view of a power bank with a device, a first power storing container and a second power storing container according to some embodiments.
Figure 9B:
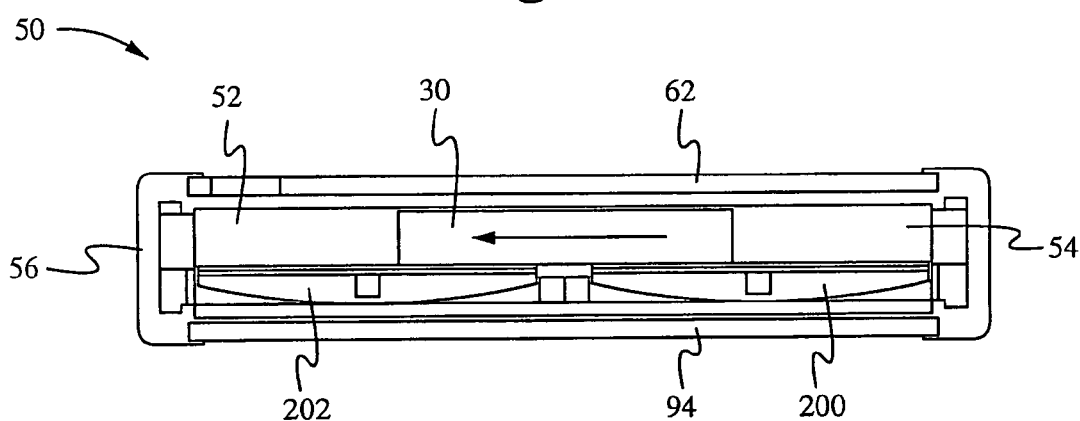
Figure 9C:
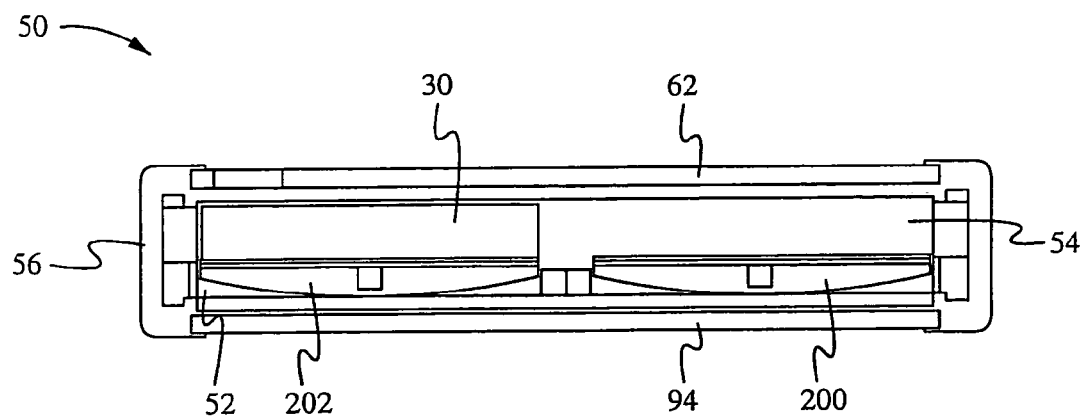

FIGS. 9A-C illustrate a top view of a power bank 50 with a device 30, a first power storing container 200 and a second power storing container 202 according to some embodiments. In some embodiments, the first power storing container 200 and/or the second power storing container 202 are similar to or the same as the power storing container 34 described herein. In FIG. 9A, the device 30 with the first power storing container 200 is shown in a second slot 54, and the second power storing container 202 in the first slot 52. The first power storing container 200 is still coupled with the device 30. The second power storing container 202 should be fully charged or at least more charged than the first power storing container 200. In FIG. 9B, the device 30 is moving between the second slot 54 and first slot 52 with the first power storing container 200 remaining in the second slot 54, and the second power storing container 202 in the first slot 52. In some embodiments, moving between the second slot 54 and the first slot 52 includes the coupling mechanisms of the device and the power storing containers aligning so that they couple together. The power bank 50 is configured to enable a smooth and seamless transition between power storing containers. Since the device 30 is in contact with at least one of the first power storing container 200 and the second power storing container 202 during the transferring, the device 30 never loses power during the transfer. In FIG. 9C, the device 30 is coupled with the second power storing container 202 in the first slot 52, and the first power storing container 200 is in the second slot 54 charging. The device 30 is then able to be removed with the second power storing container 202 powering the device 30.

Figure 10:
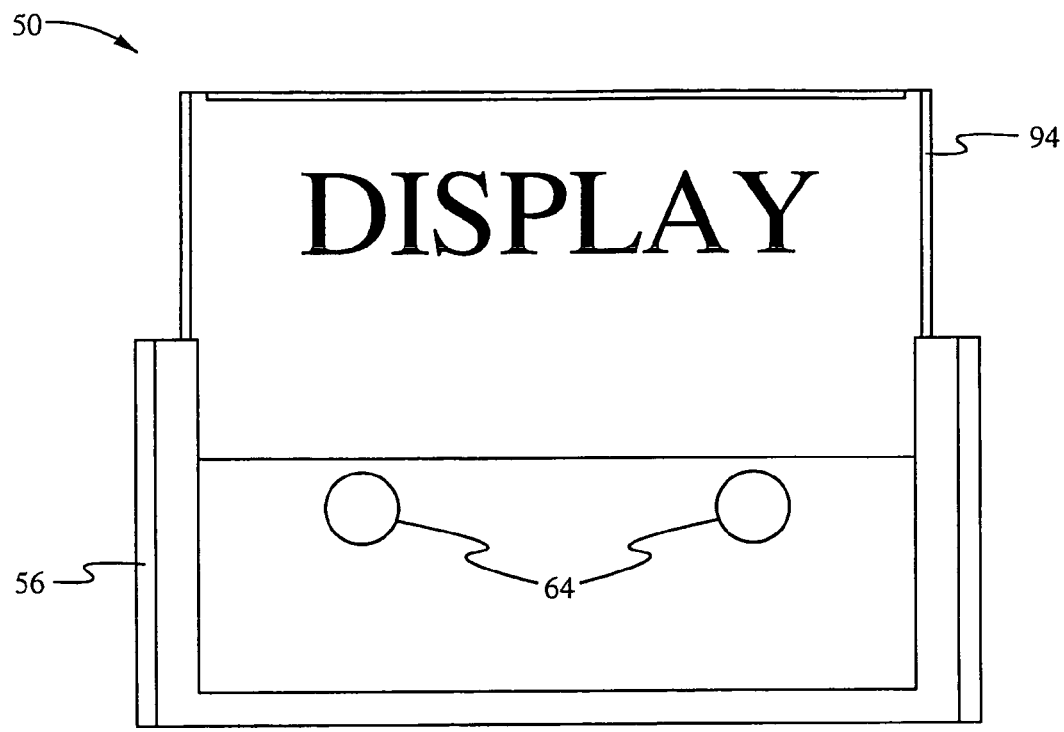
FIG. 10 illustrates a front view of a power bank according to some embodiments.

FIG. 10 illustrates a front view of a power bank 50 according to some embodiments. The power bank 50 includes a body 56 with one or more positioning mechanisms 64 configured for positioning, aligning and/or securing the power storing containers in place. The front part of the body 56 also includes a slot for receiving a display insert 94. The display insert 94 is able to slide into the body 56. In some embodiments, other components are part of and/or coupled to the front of the body 56 such as a clock, clock-radio, radio, display, touch screen, a modular digital photo frame, a digital calendar, a digital camera, a digital clock, a display system, a digital weather station, and a radio waves connected news and information system and/or others.

Figure 11:
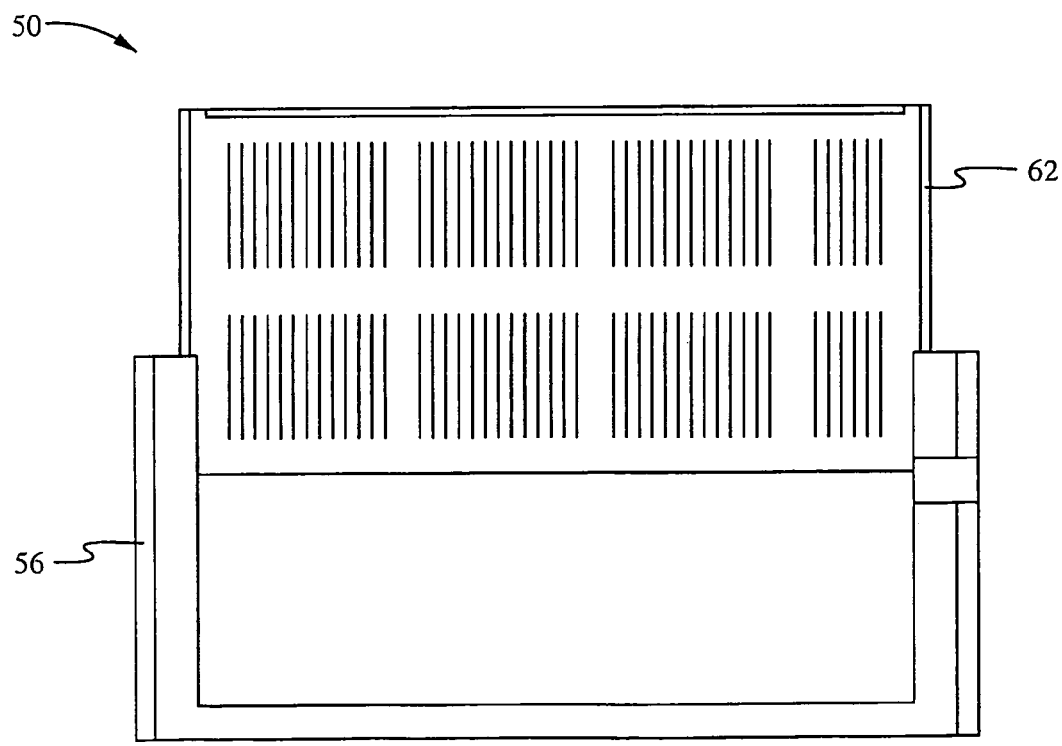
FIG. 11 illustrates a back view of a power bank according to some embodiments.

FIG. 11 illustrates a back view of a power bank 50 according to some embodiments. The back of the body 56 of the power bank includes a slot for receiving a solar panel 62. The solar panel 62 is able to slide into the body 56. In some embodiments, other components are part of and/or coupled to the back of the body 56 such as a clock, clock-radio, radio, display, touch screen, a modular digital photo frame, a digital calendar, a digital camera, a digital clock, a display system, a digital weather station, and a radio waves connected news and information system and/or others.

Figure 12:
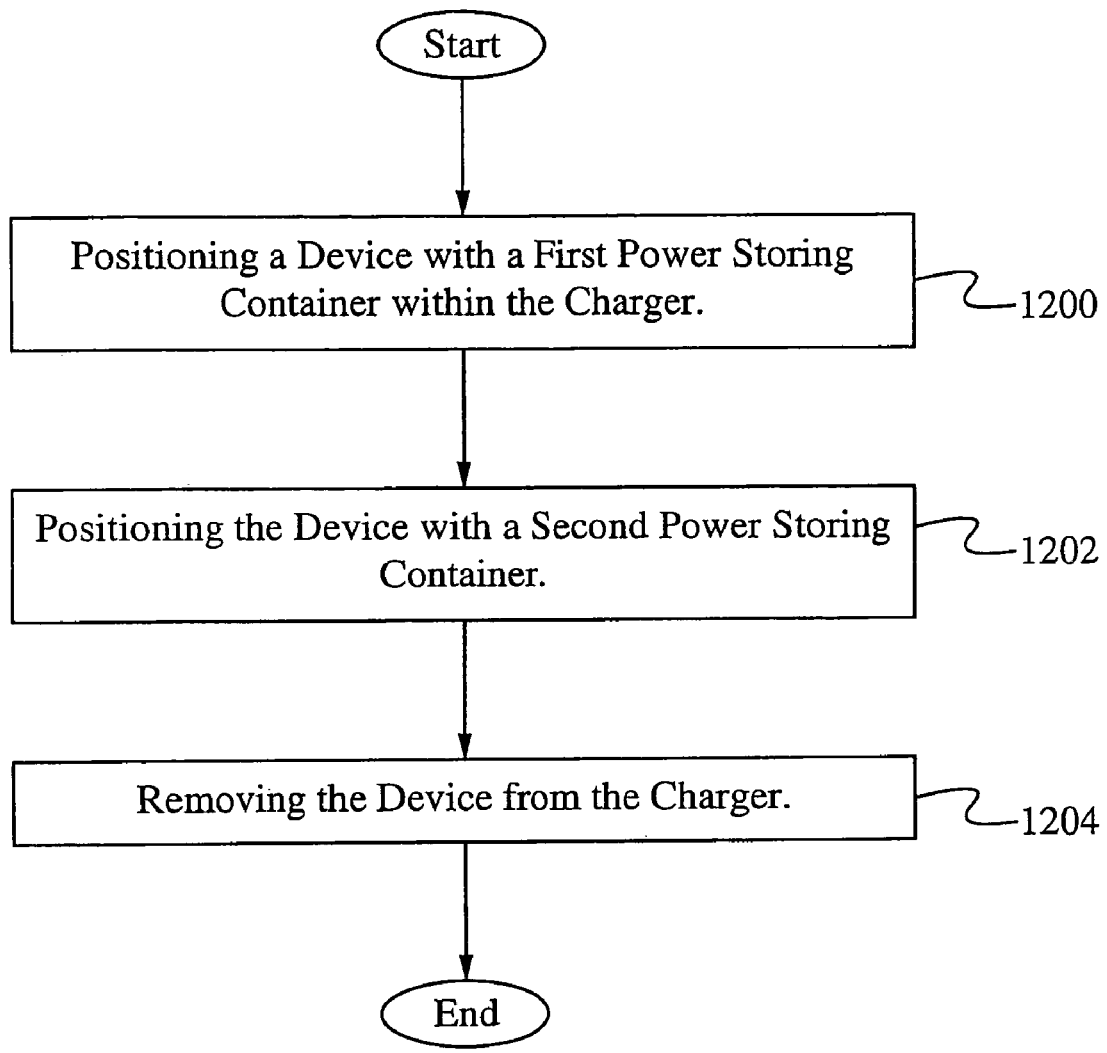
FIG. 12 illustrates a flowchart of a method of utilizing power storing container transferring according to some embodiments.

FIG. 12 illustrates a flowchart of a method of utilizing power storing container transferring according to some embodiments. In the step 1200, the device with a first power storing container is positioned within the power bank. In some embodiments, the device with the first power storing container is inserted into a slot of the power bank. In the step 1202, the device is positioned with a second power storing container. In some embodiments, positioning includes moving or sliding the device from the first power storing container to the second power storing container while maintaining contact with at least one of the first power storing container and the second power storing container. The first power storing container is able to remain in the first slot to charge. In the step 1204, with the second power storing container coupled to the device, the device with the second power storing container is removed from the power bank. The process is able to be repeated by transferring power storing containers to maintain a powered device without having to wait while the device is coupled to an outlet to charge a power storing container. Thus, the device truly remains a mobile device.

Figure 13:
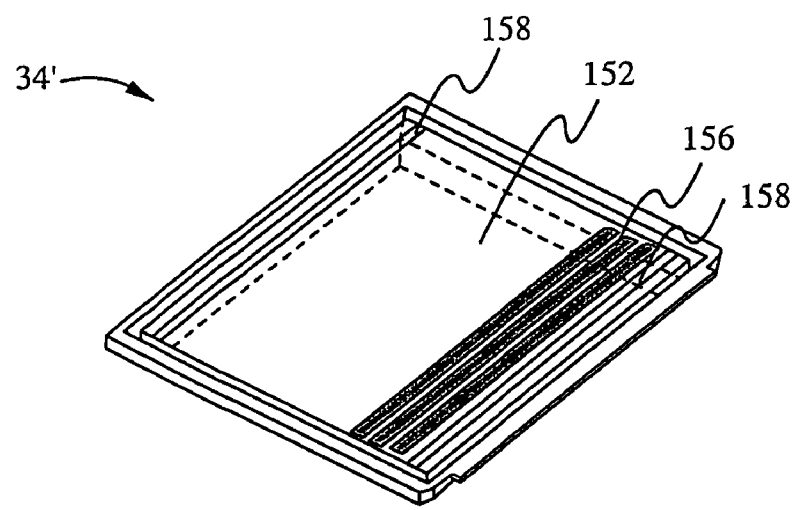
FIG. 13 illustrates a perspective view of a power storing container according to some embodiments.

FIG. 13 illustrates a perspective view of a power storing container 34' according to some embodiments. In some embodiments, instead of a power storing container including a case with a coupling mechanism and contacts, the power storing component 152 itself includes a coupling mechanism 158 (e.g. grooves and rails) and contacts 156 without the case. Thus, the power storing component 152 is able to be coupled to the device by moving or another method without the need of additional packaging. This is able to save in terms of costs as well as providing a smaller form factor. The power storing container 34' is also able to include an identification mechanism 160 (FIG. 8).

Figure 14:
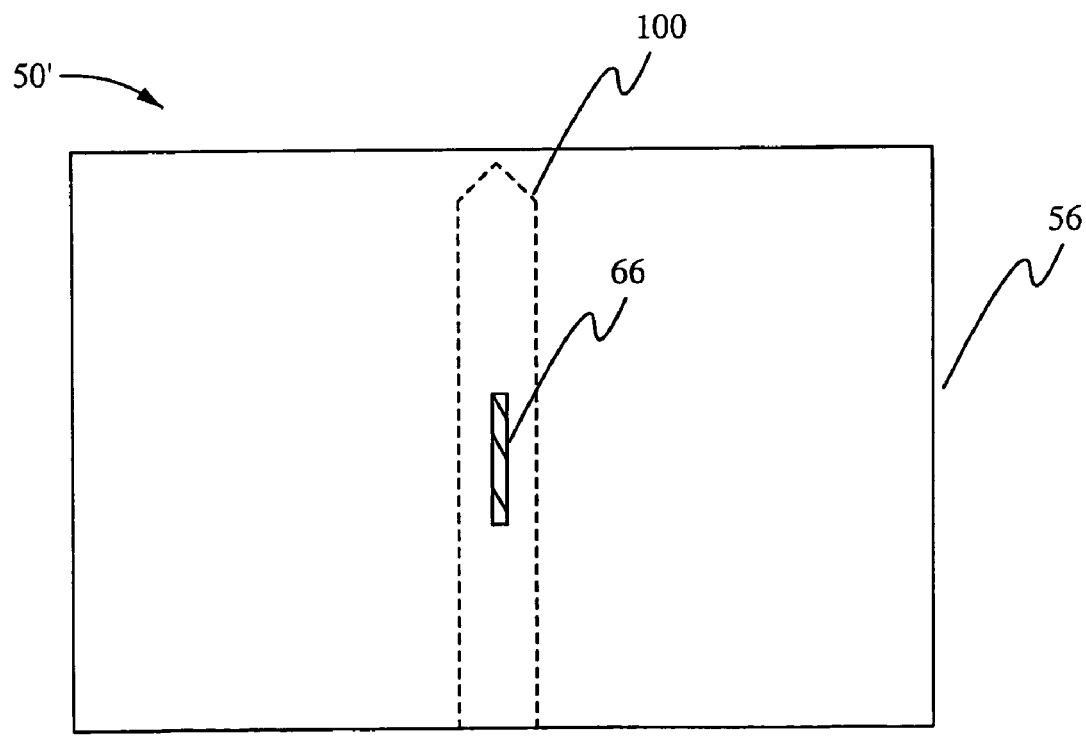
FIG. 14 illustrates a front view of a power bank with a hinge according to some embodiments.

FIG. 14 illustrates a front view of a power bank 50' with a hinge 66 according to some embodiments. As described above, in some embodiments, the power bank 50' includes the hinge 66. In some embodiments, the hinge 66 is located on the outside of the body 56, in line with the divider 100. In some embodiments, the hinge 66 is located elsewhere, such as inside the body 56 or inside the divider 100. The hinge 66 enables the powerbank 50' to fold around the hinge 66 so that the width of the power bank 50' is roughly halved. In embodiments with the hinge 66, the opposite side (e.g. the back face) is flexible, segmented, removable, does not exist or some other implementation is used to allow the power bank 50' to fold.

Figure 15:
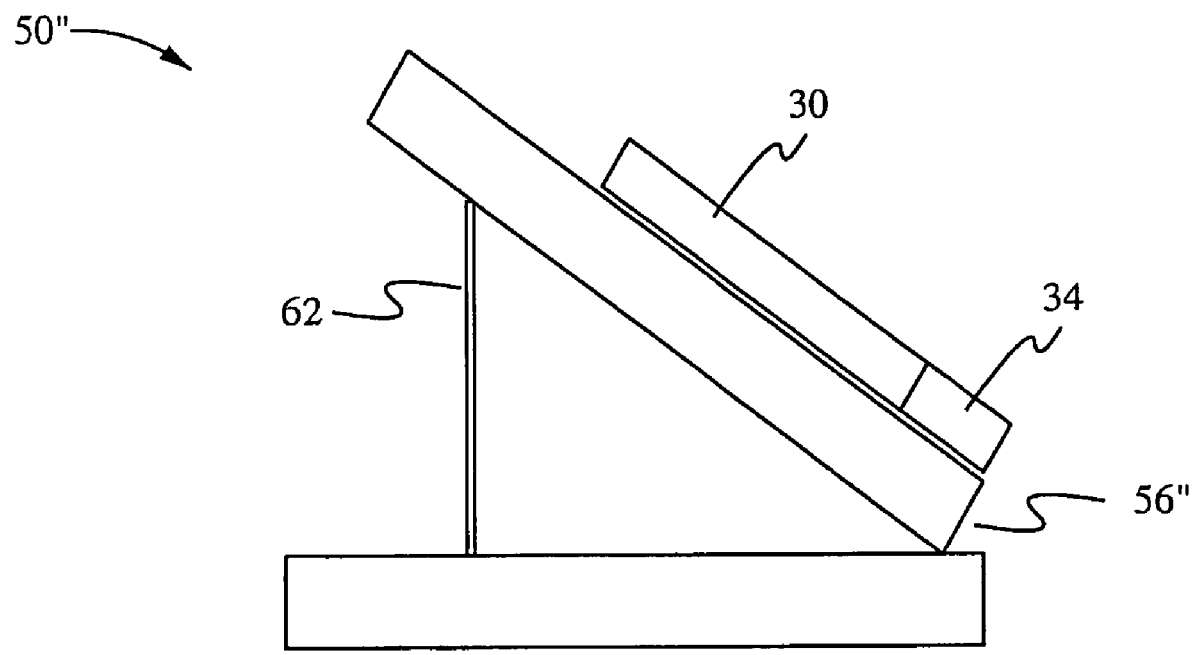
FIG. 15 illustrates a side view of an angled power bank according to some embodiments.

FIG. 15 illustrates a side view of an angled power bank 50" according to some embodiments. The power bank 50" includes a body 56" with a base and an angled component. The angled component allows the use of gravity to align and ensure that the device 30 and the power storing container 34 are positioned properly to make the power storing container transferring. In some embodiments, a solar panel 62 or other component is able to be located between the base and the angled component. Other than the slight body change, the angled power bank 50" functions very similarly to the power bank 50. A user is able to place the device 30 with the power storing container 34 in a first slot of the angled power bank 50", and a second power storing container is charged in a second slot of the angled power bank 50". The user then moves (e.g. slides) the device 30 over to the second power storing container which leaves the first power storing container charging in the angled power bank 50". The angled power bank 50" is able to include any of the relevant components of the power bank 50.

Figure 16:
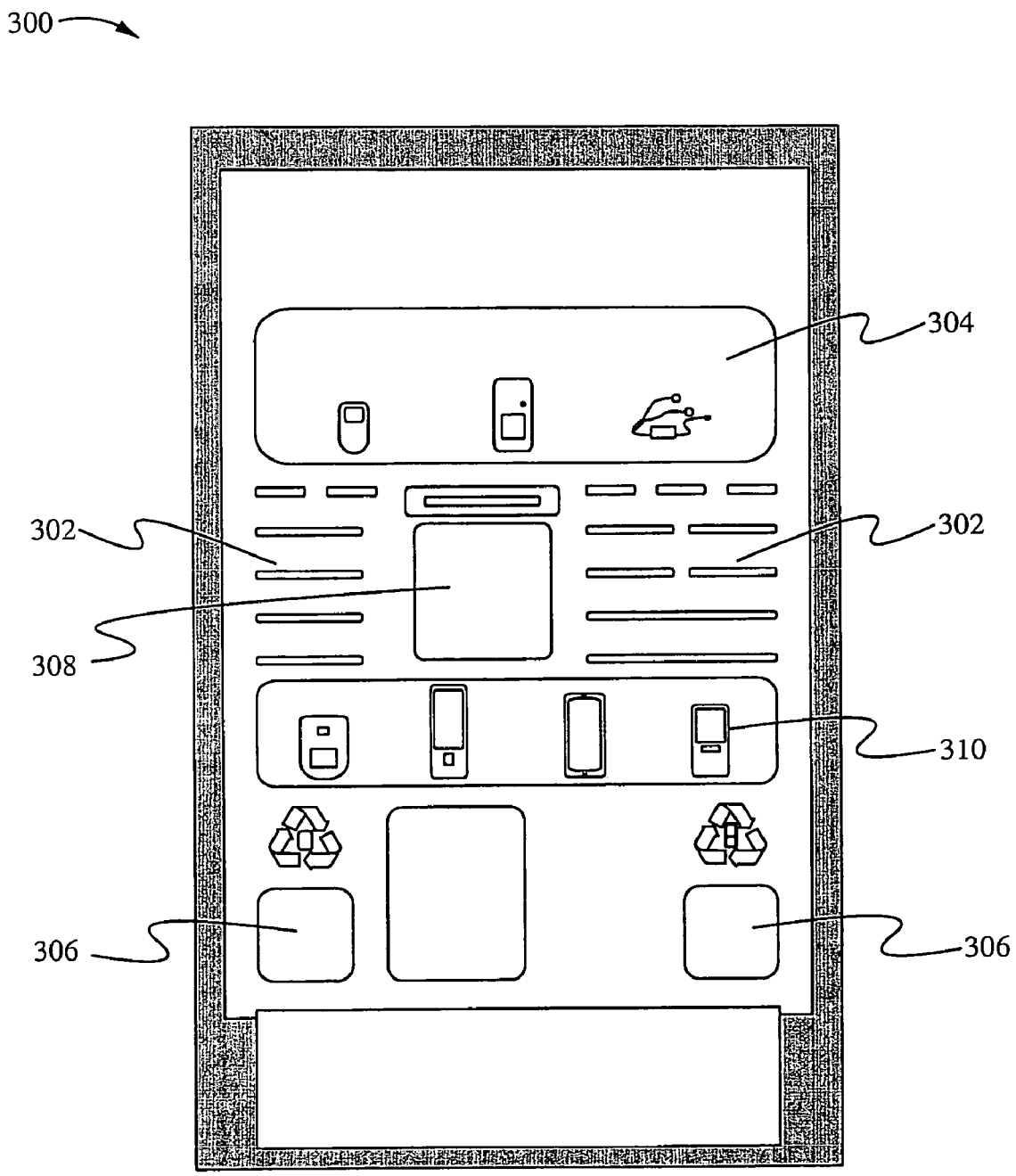
FIG. 16 illustrates a front view of a vending machine according to some embodiments.

FIG. 16 illustrates a front view of a vending machine 300 according to some embodiments. The vending machine 300 includes one or more vending power bank(s) 302 which are similar to the power bank 50 described herein with several modifications. The vending power banks 302 include a body with an area (e.g. slots) to insert a device with a power storing container and transfer the power storing container almost instantly without the device losing power/functionality. However, since the vending machine 300 is intended to allow many users to transfer their power storing containers, the vending power banks 302 include capabilities to charge many power storing containers. In some embodiments, a mechanism 350 (FIG. 17) such as a conveyor belt or other mechanism is able to move/position/rotate the power storing containers, so that the most recently received power storing container is at the end of the line and charging, and the most distantly received power storing container which is fully charged is at the front of the line, ready to be transferred. For example, after each transfer, the vending power bank 302 moves the discharged or drained power storing container into a charging mechanism and positions a fully charged power storing container in an appropriate position for being transferred. The user uses the vending power bank 302 similar to the power bank 50, by placing the device and power storing container within the vending power bank 302 and moving the device from a first position to a second position (e.g. first slot to a second slot). The charged power storing container is then within the device, and the used/discharged power storing container remains withing the vending power bank 302 to be charged. Alternatively, the device is stationary and the power storing containers are rotatably transferred. For example, a user inserts the device into the vending power bank 302, and then the power storing container within the device is removed or displaced, and a charged power storing container is positioned/moved into place, coupling with the device. The process is able to be done very quickly and is transparent to the user.

The vending power bank 302 or another component of the vending machine 300 is able to detect the life of the power storing container, and whether it is approaching its end of life. The power storing container is then able to be recycled, tested to determine why it reached its end of life or other actions are able to be taken. In some embodiments, different sizes or types of power storing containers are available within separate vending power banks 302. In some embodiments, one vending power bank is used with the ability to configure to use several sizes/form factors of power storing containers. In some embodiments, an indicator is able to be used to indicate if the next available power storing container is charged. The number of power storing containers contained within each vending power bank 302 and/or vending machine 300 is able to vary anywhere from a few to many (such as hundreds or thousands).

A display 304 is able to showcase new products. Furthermore, since the vending machines 300 are able to be placed in specified locations, the showcase is able to include targeted ads. For example, a vending machine 300 placed in a college dorm room is able to include new music/video phones, whereas a vending machine 300 in an office building is able to include new business phones.

One or more recycle deposit areas 306 are also able to be included with the vending machine 306 to allow a user to recycle a power storing container and/or device when the user is ready to recycle it. Having a recycle deposit area 306 in the immediate location of where the power storing containers are transferred will increase the likelihood that users will recycle their products. In some embodiments, the recycle deposit areas 306 are separate areas (e.g. one for phones and one for power storing containers).

The vending machines 300 are able to include an interface 308 such as a touch screen, keypad or any other interface. The interface 308 enables users to interact with the vending machine 300 such as to purchase power storing container use. In some embodiments, the vending machines 300 also include items for sale 310 such as accessories for devices, prepaid cards and other items.

The vending machines 300 are able to be used on a pay-per-use basis, monthly subscription or other implementation that allows users to transfer power storing containers easily. The vending machines 300 are able to include features to accept payments and provide a convenient user experience. In some embodiments, a mechanism is included to detect that the user has paid properly, and users who have not paid will not be able to transfer their power storing containers.

Figure 17:
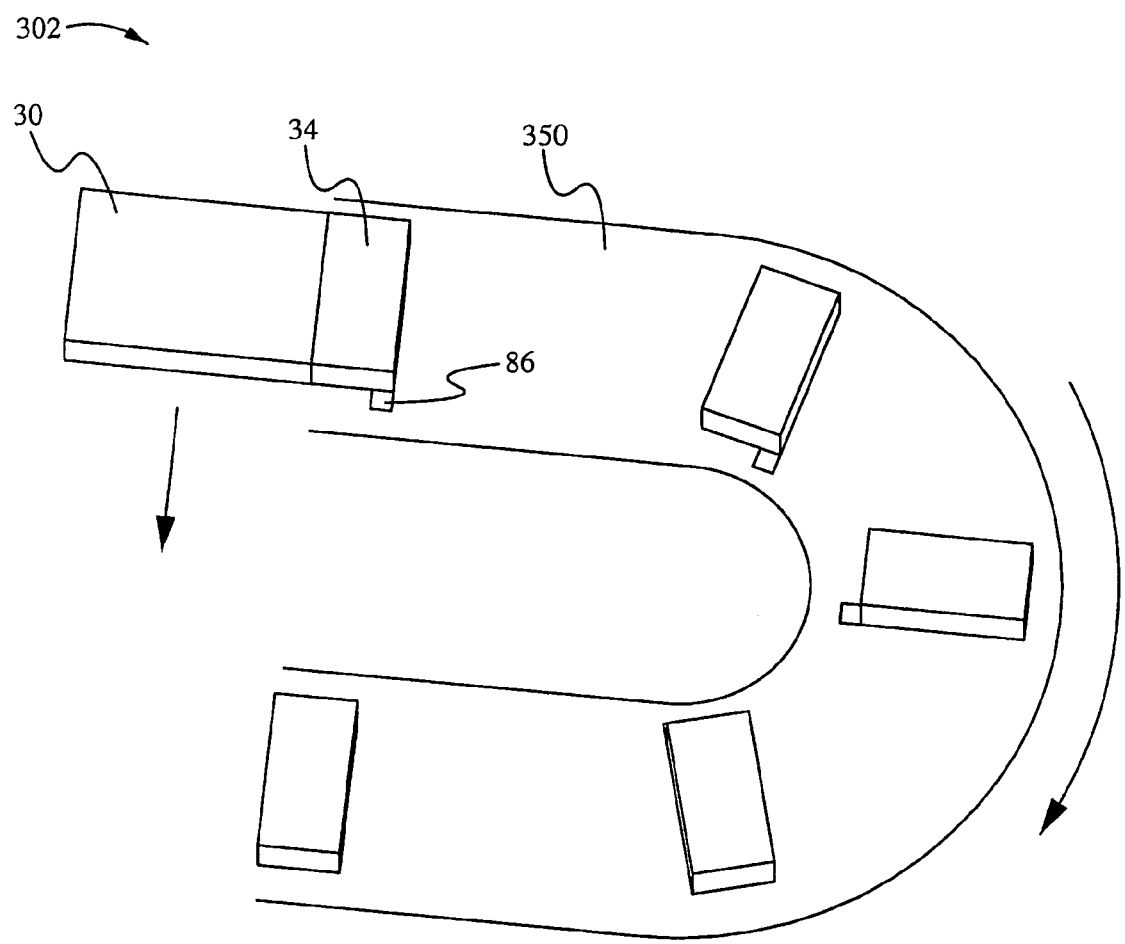
FIG. 17 illustrates a partial internal view of a vending machine including a power bank according to some embodiments.

FIG. 17 illustrates a partial internal view of a vending machine 300 including a vending power bank 302 according to some embodiments. As described briefly above, the vending power bank 302 is able to accept a device 30 with a power storing container 34 similarly to or the same as the power bank 50. The user is then able to move the device 30 to transfer the power storing container 34 for a charged power storing container. The power storing container that remains is charged by coupling with contacts 86 or another implementation. The power storing container that remains and additional power storing containers are charged while remaining on a mechanism 350 such as a conveyor belt which moves/positions/rotates the power storing containers into place to be transferred. Although a conveyor belt is shown, any mechanism is able to be used to position charged power storing containers into place to be transferred, so that a user is able to easily replace a drained power storing container with a charged power storing container. As described above, the process of transferring power storing containers is able to be automated so that the user does not even move the device. The device is able to remain stationary, and the power storing containers move and are rotatably transferred. For example, a user inserts the device into the vending power bank 302, and then the power storing container within the device is removed or displaced, and a charged power storing container is positioned/moved into place, coupling with the device. The process is able to be done very quickly and is transparent to the user.

Example 1

One exemplary device that would benefit from the power storing container transferring method and system is a power hungry, smart phone device which acts as a mobile phone with Bluetooth, big backlit touchscreen, mega pixel camera with flash, music player, video player, radio player, mobile TV player, digital voice recorder, voice recognition command center, email device, Internet browser, spreadsheet presentation capable, calendar, task organizer, VOIP capable, GPS, Wi-Fi, Wi-max, world alarm clock, PDA with GSM and CDM.

Typically, when a user purchases this device, he receives one charger and one power storing container bundled with it, and then he buys extra chargers for the office and car and one or more extra/spare power storing containers. If instead, the user purchases a power bank that includes an extra power storing container and is able to charge one power storing container while the other is in use and then provide a quick change of power storing containers when desired, the user will have a much smoother use of the device and will rarely, if ever, be required to place the device in a wired configuration for an extended period of time.

In another implementation, instead of utilizing a device which includes multiple power storing container charging slots, separate chargers are able to be implemented in separate locations so that a power storing container is charged or charging in the locations. For example, multiple chargers are able to be bundled, each with a power storing container pre-packaged, so that the user is able to have a charger and a power storing container for the vehicle, home and office. On a typical day, the user wakes up and easily transfers his phone power storing container with a charged power storing container at home. While at home, he quickly checks email, voicemail and listens to the radio which depletes the power storing container by some percentage. Then, when he is in the vehicle he is able to replace the power storing container with the charged power storing container in the vehicle. With further usage, that power storing container is depleted enough, but he is able to replace it, wherever he is such as at the office. He is able to continuously transfer the power storing container for a charged power storing container.

Such quick transferring will allow a manufacturer to manufacture smaller power storing containers which last a shorter amount of time (such as 4 hours), while still providing the same device with its many capabilities. Power storing container manufacturers will not need to pack more cells per inch to make the power storing container last longer, nor will they need to make faster chargers which run the risk of overheating and cause other problems.

Example 2

For power storing container-powered vehicles, a similar kind of power bank with two slots is able to be installed at home, work, commercially at power stations (e.g. gas, solar, wind), where a user aligns the power storing container-powered or hybrid vehicle to dock the power storing container in the power bank and release the lever to release the power storing container and then rotate the power bank mechanically or with an electric motor to align the charged power storing container to be docked and locked in the vehicle. This way, the power storing container is able to be transferred in a vehicle, keeping the fundamentals of the method the same.

Devices such as wireless and mobility devices include, but are not limited to, wireless/portable electronic/electric devices such as laptops, phones, cameras, camcorders, computers, watches, camera-watches, camera-phones, GPS, headsets (e.g. Bluetooth), games, tools such as electric/power tools, military/hospital/medical equipment, wearable attire with power components such as shoes, sunglasses, glasses, wearable cameras, wearable televisions, radios, walky-talkies, gaming systems, toys, remote controls, music players, and surface/air/water and hybrid vehicles/automobiles including, but not limited to, battery powered, hybrid powered, plug-in hybrid powered, grid powered, alternate fuel powered, solar, wind, hydrogen powered cars, scooters, motorcycles, sega road transport, trucks, rail, buses, boats, air planes/gliders and any other devices or vehicles.

The power bank is able to be composed of any appropriate material such as metal, plastic, rubber, wood, cardboard, others or any combination thereof. The structure of the power bank is able to be modified to accommodate any device. Additional components are also able to be included within the power bank to properly perform the method described herein.

In some embodiments, instead of inserting a device in a power bank with horizontally adjacent slots, the slots are vertically stacked on top of one another. The power bank is designed to be low cost and commercially viable for mass adoption. The power bank is designed to be a power bank for clean energy storage. The power bank is designed to be a power generator for the electric grid through clean energy sources. The power bank is designed to be a docking station for wireless and mobility devices. The power bank is designed to be modular. The power bank is designed for enabling data transfer from a device. The power bank is also designed to be a beautiful ornament for a user's work desk.

In conjunction with the system and method described herein, a method of using the power storing container as a service is also included. Instead of a user purchasing a power storing container, the user is able to purchase the power of the power storing container. For example, for a monthly fee, a user is able to replace a discharged power storing container with a charged power storing container using a transferring system.

To utilize the instant power storage and power transfer method and apparatus, a user utilizes a device such as a mobile phone as he typically would. When the power storing container of the device is drained enough that the user wants to charge the power storing container, the user inserts the device and power storing container into a power bank which receives the power storing container. The user is then able to decouple the device from the power storing container which remains in the power bank and begins to recharge. The user then positions the device at the extra power storing container that is already charged and the device couples to that power storing container. In some embodiments, the transfer of the power storing containers occurs by moving the device from one power storing container to the other. The device is able to maintain power during the power storing container transfer either by staying in contact with at least one of the power storing containers during the transferring process or by using a mechanism such as an extra internal power storing container. With the charged power storing container, the user is able to continue using the device without interruption. The power storing container transfer is able to occur in a very short period of time such as less than 2 seconds.

In operation, the instant power storing container transferring system and method are able to be easily, safely, instantly and effortlessly used for charging and replacing power storing containers in all powered devices. Charged devices are able to be maintained much easier, meaning users will have more incentive to continue using devices without having to worry about running out of power. Transferring power storing containers by moving the device from one power storing container to another power storing container is very convenient by not requiring a device to be shut down during the transfer. For example, if a user's mobile phone power storing container is running low, he is able to place the phone in the power bank, move the phone over to the charged spare power storing container and continue the conversation without having to disconnect.

In the past, wireless devices in general were required to couple to a wire to be charged. For example, many people would plug in their mobile phone to charge the power storing container at night. However, with the power storing container transferring described herein, the device is able to remain wireless and wire-free as it is not coupled to a wired power bank for more than a brief moment. Furthermore, since the transfer of the power storing container is so quick and without much user interaction, the action is transparent to the user. The power bank is capable of storing power in multiple form factors.

Also, described herein is a power storing and power transferring system and device wherein power and electrical charge is transferred with a power storing container itself, the power storing container replaces itself with a fully powered or charged power storing container in a completely automated fashion without interruption of a host devices primary function and in a manner that is completely transparent to a user of the host device, the container also puts itself in a repowering position in a completely automated fashion, transparent to the user.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of replacing a power storing container comprising:
   a. positioning a device with a first power storing container into a power bank; and
   b. moving the device away from the first power storing container and to a second power storing container that has been charged within the power bank.
2. The method of claim 1 further comprising:
   c. positioning the device with the second power storing container into the power bank; and
   d. moving the device away from the second power storing container and to the first power storing container.
3. The method of claim 2 wherein one of the first power storing container and the second power storing container remains in the device and charges.
4. The method of claim 1 wherein the device does not lose power when moving between the first power storing container and the second power storing container.
5. The method of claim 1 wherein the first power storing container and the second power storing container are selected from the group consisting of a rechargeable battery, a lithium ion battery, a water power device, a methane power device, a fuel cell, a capacitor, a transistor, a charged metal, a hybrid power device and/or combinations thereof.
6. A method comprising:
   a. inserting a device including a first power storing container into a power bank;
   b. decoupling the first power storing container from the device;
   c. coupling the device to a second power storing container positioned in the power bank; and
   d. decoupling the second power storing container from the power bank.
7. The method of claim 6 further comprising:
   e. inserting the device including the second power storing container into the power bank;
   f. decoupling the second power storing container from the device;
   g. coupling the device to the first power storing container positioned in the power bank; and
   h. decoupling the first power storing container from the power bank.
8. The method of claim 6 wherein the first power storing container and the second power storing container begin to charge upon insertion into the power bank.
9. The method of claim 6 wherein the first power storing container and the second power storing container are approximately fully charged when decoupling from the power bank.
10. The method of claim 6 wherein the device includes a backup power storing container for providing power to the device while the device is decoupled from the first power storing container and the second power storing container.
11. The method of claim 6 further comprising moving the device between the first power storing container and the second power storing container.
12. The method of claim 6 wherein the first power storing container and the second power storing container are selected from the group consisting of a rechargeable battery, a lithium ion battery, a water power device, a methane power device, a fuel cell, a capacitor, a transistor, a charged metal, a hybrid power device and/or combinations thereof.

* * * * *